Patented Sept. 2, 1947

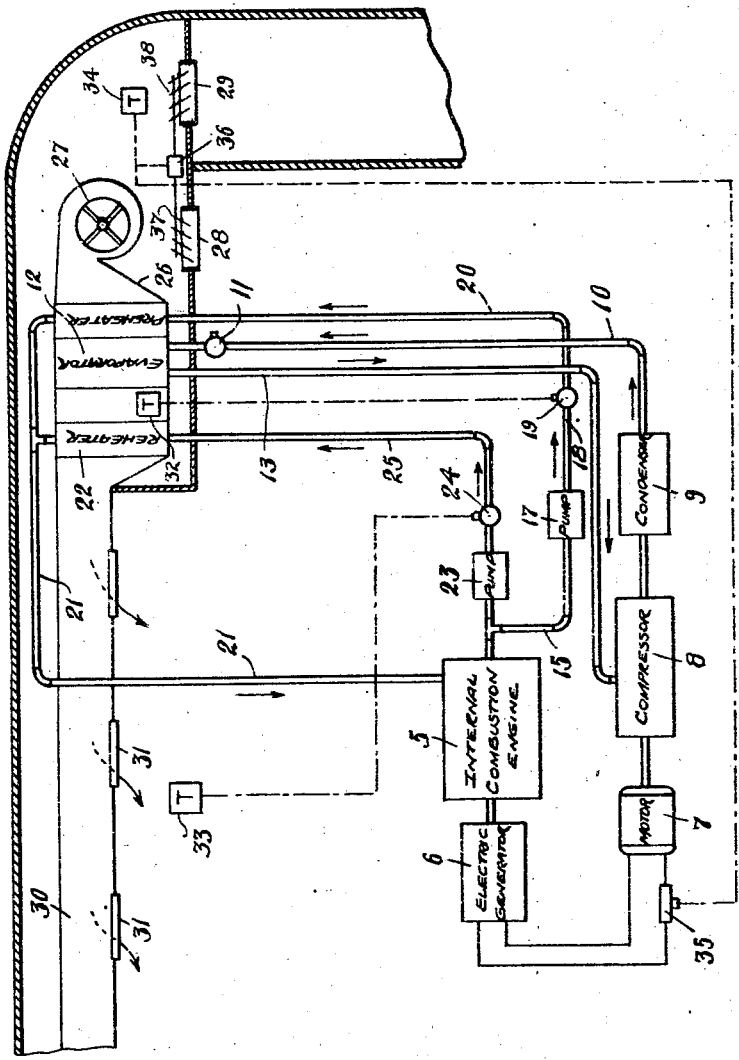

2,426,827

UNITED STATES PATENT OFFICE 2,426,827

REFRIGERATION APPARATUS

Harold Hemming, Dedham, and Charles R. Keep, Norwood, Mass., assignors, by mesne assignments, to Westinghouse Electric Corporation, a corporation of Pennsylvania Application September 21, 1943, Serial No. 503,216

4 Claims. (Cl. 257—3)

This invention relates to refrigeration apparatus for air cooling using direct expansion, air cooling evaporators.

It is desirable to maintain a compressor supplying refrigerant to an air cooling evaporator in constant operation for preventing the rises in the wet bulb temperature of the air which occur when the compressor is started and stopped under thermostatic control. In the past multiple cylinder compressors have been operated continuously to supply refrigerant to multiple section, air cooling evaporators and the compressors have been unloaded and the number of active evaporator sections have been varied responsive to load changes. This has required expensive and complicated controls which many feel are not justified by the results obtained.

This invention provides a continuously operating compressor and maintains a constant load upon the evaporator supplied thereby with refrigerant, by adding heat to the air entering the evaporator when the air cooling load decreases. The invention is particularly suitable for systems utilizing internal combustion engines for energy supply since the preheat can be supplied by the jacket cooling water of the engines, thus cooling this water and decreasing the fan power required for engine cooling.

Objects of the invention are to simplify and to reduce the cost of controls for refrigeration systems using air cooling evaporators.

The invention will now be described with reference to the drawing which is a diagrammatic view of an air conditioning system embodying this invention.

The drawing illustrates an air conditioning system for a railway passenger car having a Diesel engine 5 which drives an electric generator 6 which in turn supplies electric current to the motor 7 which drives the refrigerant compressor 8. The compressor 8 supplies a suitable volatile refrigerant to the condenser 9 and then through the pipe 10 and the expansion valve 11 into the evaporator 12. The refrigerant vapor is returned through the pipe 13 into the suction side of the compressor.

The preheater 14 is located upstream with respect to air flow, of the evaporator 12 and is supplied through the pipe 15, the pump 17, the pipe 16, the valve 19 and the pipe 20, with jacket cooling water from the engine 5. The water leaving the preheater 14 passes through the pipe 21 back to the engine 5.

The reheater 22 is located downstream with respect to air flow, of the evaporator 12 and is supplied through the pump 23, the valve 24 and the pipe 25 with jacket water from the engine 5. This water from the reheater 22 is returned through the pipe 21 to the engine.

The preheater 14, the evaporator 12 and the reheater 22 are arranged in the air conditioning compartment 26 in the upper part of the passenger car illustrated. The fan 27 draws recirculated air from the passenger space through the inlet 28 and outdoor air through the inlet 29 and blows it through the compartment 26 and into the duct 30 from which it passes through the outlet 31 into the passenger space.

The compressor 8 is operated continuously when air cooling is required. The thermostat 32 which may be a dry bulb thermostat, is located between the evaporator 12 and the reheater 22 and is connected to the valve 19 and controls the volume of water supplied by the pump 17 to the preheater 14. As the air cooling load decreases the temperature of the air leaving the evaporator 12 decreases. The thermostat 32 responds and admits more water into the preheater 14 causing it to heat the air entering the evaporator so that the air leaving the evaporator is maintained substantially at a constant temperature with the result that the evaporator has a constant load.

The thermostat 32 thus may be regarded as a dew point thermostat which even though the air to which it is exposed is not saturated, maintains substantially a constant dew point temperature in the air leaving the evaporator. This temperature may, for example, be 55° F.

The dry bulb thermostat 33 responds to the temperature of the air in, or delivered through the outlets 31 into, the passenger space and is connected to and controls the valve 24 and adjusts the valve 24 to cause it to pass a larger volume of water into the reheater 22 when the delivered air is too cold.

The thermostats 32 and 33 are seen to cooperate in that the thermostat 32 acts to maintain a low temperature and a resulting low moisture content in the delivered air while the thermostat 33 acts to raise the sensible heat of the air so that it is discharged without discomfort into the passenger space.

The thermostat 34 is located in the path of the outdoor air entering the fan 27 and is connected to the electric switch 35 in the electric supply line from the generator 6 to the compressor motor 7 and to the motor 36 which adjusts the shutters 37 in the recirculated air inlet 28 and the shutters 38 in the outdoor air inlet 29. If due to a change in the weather or due to the train entering a region of low temperature, the temperature of the outdoor air is sufficiently low, say as low as 60° F., so that the operation of the compressor is not required, the thermostat 34 acts to open the switch 35 for stopping the motor 7. At the same time it controls the motor 36 to close or substantially close the recirculated air shutters 37 and to open the outdoor air shutters 38 so that all outdoor or substantially all outdoor air is supplied by the fan 27 into the car.

When the temperature of the outdoor air is above 60° F., the thermostat 34 causes the motor 36 to adjust the shutters 37 and 38 for partial recirculation to provide, say 25% outdoor air and 75% recirculated air, into the car.

For cold weather operation when refrigeration is not required, the preheater 14 and the reheater 22 can both be supplied with water under control of the thermostat 33.

While one embodiment of the invention has been described for the purpose of illustration, it should be understood that the invention is not limited to the exact apparatus and arrangement of apparatus illustrated as modifications thereof may be suggested by those skilled in the art without departure from the essence of the invention.

What is claimed is:

1. In a refrigeration system having an air cooling evaporator, a fan for moving air through said evaporator and into the space served thereby, a continuously operated compressor for supplying refrigerant to said evaporator, a liquid cooled internal combustion engine for supplying energy for driving said compressor, the combination of a preheater located upstream with respect to air flow of said evaporator, a reheater located downstream with respect to air flow of said evaporator, means for supplying cooling liquid from said engine to said preheater and said reheater, and means including means responsive to the temperature of the air between said evaporator and reheater for varying the volume of liquid from said engine to said preheater.

2. In a refrigeration system having an air cooling evaporator, a fan for moving air through said evaporator and into the space served thereby, a continuously operated compressor for supplying refrigerant to said evaporator, a liquid cooled internal combustion engine for supplying energy for driving said compressor, the combination of a preheater located upstream with respect to air flow of said evaporator, a reheater located downstream with respect to air flow of said evaporator, means for supplying cooling liquid from said engine to said preheater and said reheater, means including means responsive to the temperature of the air between said evaporator and reheater for varying the volume of liquid from said engine to said preheater, and means including means responsive to the temperature of the air delivered into said space for varying the volume of liquid from said engine to said reheater.

3. In a refrigeration system having an air cooling evaporator, a fan for moving air through said evaporator and into the space served thereby, a continuously operated compressor for supplying refrigerant to said evaporator, a liquid cooled internal combustion engine for supplying energy for driving said compressor, the combination of a preheater located upstream with respect to air flow of said evaporator, a reheater located downstream with respect to air flow of said evaporator, means for supplying cooling liquid from said engine to said preheater and said reheater, means including means responsive to the temperature of the air between said evaporator and reheater for varying the volume of liquid from said engine to said preheater, and means including a thermostat responsive to the temperature of the outdoor air for discontinuing the operation of said compressor upon a decrease in the temperature of the outdoor air to a predetermined point.

4. In a refrigeration system having an air cooling evaporator, a fan for moving air through said evaporator and into the space served thereby, a continuously operated compressor for supplying refrigerant to said evaporator, a liquid cooled internal combustion engine for supplying energy for driving said compressor, the combination of a preheater located upstream with respect to air flow of said evaporator, a reheater located downstream with respect to air flow of said evaporator, means for supplying cooling liquid from said engine to said preheater and said reheater, means including means responsive to the temperature of the air between said evaporator and reheater for varying the volume of liquid from said engine to said preheater, means including means responsive to the temperature of the air delivered into said space for varying the volume of liquid from said engine to said reheater, and means including a thermostat responsive to the temperature of the outdoor air for discontinuing the operation of said compressor upon a decrease in the temperature of the outdoor air to a predetermined point.

HAROLD HEMMING.
CHARLES R. KEEP.

REFERENCES CITED

The following references are of record in the file of this patent:

UNITED STATES PATENTS

| Number | Name | Date |
|---|---|---|
| 2,218,468 | Haines | Oct. 15, 1940 |
| 2,263,929 | McGrath | Nov. 25, 1941 |
| 1,988,495 | Hulse | Jan. 22, 1935 |
| 1,943,969 | Hulse | Jan. 16, 1934 |
| 2,177,597 | Haines | Oct. 24, 1939 |